United States Patent [19]
Gilge

[11] Patent Number: 5,666,212
[45] Date of Patent: Sep. 9, 1997

[54] METHOD OF CODING IMAGE SEGMENTS OF ANY SHAPE

[75] Inventor: Michael Gilge, Berkeley, Calif.

[73] Assignee: ANT Nachrichtentechnik GmbH, Backnang, Germany

[21] Appl. No.: 594,168

[22] Filed: Oct. 9, 1990

[30] Foreign Application Priority Data

Oct. 6, 1989 [DE] Germany ............... 39 33 346.9

[51] Int. Cl.$^6$ ........................... H04N 1/415
[52] U.S. Cl. ............. 358/432; 358/426; 382/173; 382/232; 382/242
[58] Field of Search ............... 358/432, 433, 358/426, 429, 430; 382/173, 232, 233, 239, 242, 243, 248, 250, 251

[56] References Cited

U.S. PATENT DOCUMENTS

| | | |
|---|---|---|
| 4,797,742 | 1/1989 | Sugiyama et al. |
| 4,805,017 | 2/1989 | Kaneko et al. |

FOREIGN PATENT DOCUMENTS

| | | |
|---|---|---|
| 235803 | 3/1987 | European Pat. Off. |
| 3150203 | 6/1983 | Germany |

OTHER PUBLICATIONS

Michael Gilge, "Coding of Arbitrarily Shaped Image Segments using Moment Theory," Proceedings of EUSIPO–88 Fourth European Signal Processing Conference (Sep., 1988), pp. 855–858.

Murat Kunt et al, "Recent Results in High–Compression Image Coding," IEEE Transactions on Circuits and Systems, CAS-34 (1987), Nov., No. 11, pp. 1306–1336.

Pabel, "Transformationen in der digitalen Signalverarbeitung Teil 1," Nachrichtentechnische Zeitschrift NTZ, 37 (May, 1984) No. 5, p. 290 et seq.

N.I. Achieser, Vorlesungen Über Approximationstheorie, 2nd Edition, 1967, published by Akademie Verlag, pp. 24–26.

M.J. Biggar, et al., "Segmented–Image Coding: Performance Comparison with the Discrete Cosine Transform", IEEE Proceedings, vol. 135, Pt. F., No. 2, Apr. 1988, pp. 121–132.

I.N. Bronstein, et al., "Taschenbuch der Mathematik", published by Verlag Herri Deutsch, 23rd Edition, pp. 735–737.

Ernest L. Hall, "Computer Image Processing and Recognition", Academic Press, New. NY 1979, 413–420.

(List continued on next page.)

Primary Examiner—Scott A. Rogers
Assistant Examiner—Thomas D. Lee
Attorney, Agent, or Firm—Spencer & Frank

[57] ABSTRACT

A method of coding digital image data of an original image for transmission and reproduction. The original image is subdivided into partial image regions whose shapes are adapted to local image structures. For each partial image region, a set of two-dimensional, linearly independent basis functions is provided. The areal expanse of the basis functions approximately corresponds to the size of a rectangle circumscribing the partial image region to be coded and the raster of the sampled values of the basis functions corresponds to the pixel raster of the original image. The sampled values of the basis functions disposed within the area defined by the partial image region are orthogonalized in order to obtain a set of new, orthogonal basis functions, with the set including as many orthogonal basis functions as there are pixels within the partial image region. Coefficients of the orthogonalized basis functions describing the partial image region are then calculated. The coefficients correspond to the rectangular image regions in the partial image region and represent the gray scale values of the partial image region and thus an approximation of the original image. In a preferred embodiment, the contour of the partial image region is coded and transmitted along with the coefficients to a receiving location, where the orthogonal basis functions are generated based on the contour and the image is reproduced with the orthogonal basis functions and the coefficients.

15 Claims, 5 Drawing Sheets

OTHER PUBLICATIONS

Alston S. Householder, "Principles of Numerical Analysis", McGraw-Hill Book Company, Inc., NY, NY, 1953, pp. 72–78.

Anil K. Jain, "Fundamentals of Digital Image Processing", Prentice Hall, Englewood Cliffs, NJ, pp. 362–374.

William K. Pratt, "Digital Image Processing", John Wiley & Sons, NY, NY, pp. 232–278.

"ESPRIT '86 Results and Achievements", Edited by Directorate General XIII Telecommunications, Information, Industries & Innovation, Elsevier Science Publishers B.V., 1987 (North Holland), pp. 413–422.

Joint Photographic Experts Group ISO/IEC JTC1/SC2/WG8 CCITT SGVIII, Aug. 31, 1989.

M.J. Biggar et al, "Segmented image coding: performance comparison with the discrete cosine transform," IEEE Proceedings, vol. 135, Pt. F, No. 2 (Apr., 1988) pp. 121–132.

METHOD OF CODING IMAGE SEGMENTS OF ANY SHAPE

REFERENCE TO RELATED APPLICATION

This application claims the priority of Federal Republic of Germany Application Serial No. P 39 33 346.9 filed Oct. 6th, 1989, which is incorporated herein by reference.

BACKGROUND OF THE INVENTION

The invention relates to a method of coding digital image data, particularly for the purpose of transmission over channels having a limited transmission capacity, while employing transform coding which converts the video image or partial regions thereof by means of a transformation rule into another representation. The representation of the image data is effected by a number of coefficients corresponding to the number of pixels in the original image region. Such coefficients, however, have only a considerably lower correlation in contrast to the pixels of the video image which may have large correlations. That is, the coefficients are substantially uncorrelated while the pixels may be greatly correlated as in regions of the image where the gray scale value is substantially uniform. The independence of the coefficients allows for a selection of a subquantity of coefficients, which may be considerably smaller than the number of original pixels. The selection can be based on the coefficient amplitudes, e.g. all coefficients whose amplitudes exceed a predetermined magnitude. The selected coefficients are quantized, which reduces the amount of data further. Using the selected and quantized coefficients produces, after reversal of the transformation rule, an approximate reconstruction of the original image region.

It is known to process digital image data for transmission over channels having a limited transmission capacity by subjecting them to transform coding, e.g. a DCT (discrete cosine transform) or a Walsh-Hadamard transform as is described, for example in U.S. Pat. No. 4,805,017; and *Esprit '86, Results and Achievements*, Commission of the European Communities, Directorate General XIII, Telecommunications, Information, Industries & Innovation, Elsevier Science Publishers B.V., 1987 (North Holland), pages 413–422. All prior art methods of transform coding have in common that the images or partial image regions (segments) to be subjected to transformation have a rectangular or often even square shape. The images are divided into blocks by a regular grid and these blocks are transform coded separately. The condition that only rectangular partial image regions can be transformed has the result that, on the one hand, interference patterns in the form of the subdivision predetermined by the block grid, so-called blocking effects, occur and, on the other hand, uniform regions are unnecessarily subdivided and thus the attainable data compression is limited.

According to *Digital Image Processing*, William K. Pratt, published by John Wiley & Sons, New York, N.Y., U.S.A., pages 232–278, the image produced by the transformation can be represented by the weighted sum of a set of basis functions. The basis functions are here fixed for the entire image (see, for example, page 245, FIG. 10.3-2, Cosine Basis Functions) and are given by the type of transformation. The basis functions may, for example be in the form of polynomials or trigonometric functions.

SUMMARY OF THE INVENTION

It is an object of the invention to provide an improved digital data coding method of the above described type according to which no annoying blocking effects occur and data compression is not limited by a division into blocks. This is accomplished by transform coding partial image regions of any selected shape whose contours may be, for example, adapted to local image structures.

For each partial image region, a set of two-dimensional, linearly independent functions, so-called basis functions, equal in number to at most the number of pixels in the partial image region, is provided. These basis functions represent, for example, the sampled values of two-dimensional polynomials or trigonometric functions. The areal expanse of the basis functions approximately correspond to the size of a rectangle circumscribing the segment or partial region to be coded, and the raster of the sampled values of the basis functions corresponds to the pixel raster of the original image. The sampled values of the basis functions disposed within the area defined by the partial image region are orthogonalized in order to obtain a set of new, orthogonal basis functions, with the set including at most as many basis functions as there are pixels within the partial image region. Coefficients of the orthogonalized basis functions describing the partial image region are then calculated. The coefficients correspond to the weights of the respective basis functions in the partial image region, which represent the gray scale values of the partial image region and thus an approximation of the original partial image region.

In a preferred embodiment, the contour of the partial image region is coded using suitable techniques as described in the literature, and along with the coefficients is transmitted to a receiving location where the orthogonal basis functions are generated based on the contour and the image reproduced with the orthogonal basis functions and the coefficients.

The invention is based in part on the realization that in contrast to previous transformation methods, the partial image regions (segments) which are subjected to the transformation rule may have any desired shape and may, in particular, be adapted to the local image content in such a manner that the local image content of each respective segment is limited to similar structures. Due to these similarities, image structures of the individual segment can be defined by a smaller number of coefficients than in the prior art methods. Moreover, these coefficients may be quantized in a rough manner for further data reduction. An additional means for allowing for data reduction is obtained by using a smaller number of coefficients than there are pixels in the segment as, for example, by using a lesser number of original basis functions in obtaining the orthogonal base functions and/or ignoring some of the coefficients obtained using the orthogonal basis functions, and it becomes unnecessary to process redundant image data for uniform image regions. Moreover, the shapes of the segments are not tied to any conditions whatsoever, even multiply connected regions (segments containing holes) being permissible.

BRIEF DESCRIPTION OF THE DRAWINGS

These and other features and advantages of the invention will be further understood from the following detailed description of the preferred embodiments with reference to the accompanying drawings in which.

DESCRIPTION OF THE PREFERRED EMBODIMENTS

Before describing the invention in detail, the basic principle of transform coding will first be discussed. Transform coding involves a rule for imaging from the domain of the pixels into a coefficient domain, also called the spectral range. The transformation as such here results in no data reduction and is rather an unequivocal representation. That means that the original image can be reconstructed without errors from the coefficient representation. Rather, the advantage of transformation lies in the reduction of correlations existing between the pixels in the original image. Moreover, with increasing order in the original image, the amplitudes of the coefficients decrease quickly from their highest levels so that an approximate description of the original image may be effected with a sub-quantity of coefficients in that, for example, only the coefficients having the greatest amplitudes are transmitted to a receiver. This of course results in the ability to represent correlations between the pixels with reduced data and therefore reduced bandwidth. The receiver performs the inverse transformation, with non-transmitted coefficients being assumed to be zero. The real value coefficients can additionally be quantized, again introducing an error. Thus, depending on the number of transmitted coefficients and on the quantization of the amplitudes, a more or less falsified reconstruction of the original image is obtained in the receiver. However, at the same time, a much smaller data rate is required for transmission than would have been the case for faithfully reproducing the original image.

Figure 1:
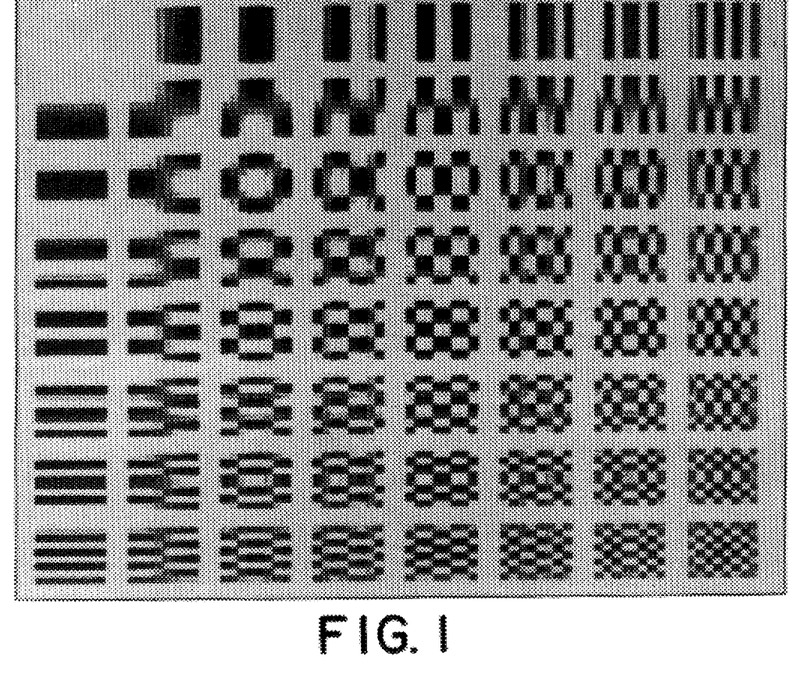
FIG. 1 shows DCT basis images.

The image or image function represented by the transformation can be illustrated very clearly with the aid of basis images (two-dimensional basis functions). The image function is represented by a weighted sum of basis images. The basis images are here predetermined according to the type of transformation to be employed. FIG. 1 shows a set of basis images as defined by the discrete cosine transform (DCT) for square image regions (blocks) of a size of 8 pixels by 8 pixels. The weighting factors for the basis images are the coefficients. By appropriate selection of coefficients, any desired gray scale value distribution in the block can be represented. Since the finer structures occur less frequently and are looked upon with much more tolerance by the human eye, it is usually sufficient to form a weighted combination of low frequency basis images as they are shown in the upper left portion of FIG. 1.

Mathematically, the representation of a reconstructed image block $g(x_k, y_l)$ can be expressed as follows by N-basis functions $\phi n(x_k, y_l)$, n=1 to N:

$$g(x_k,y_l) = a_1\phi_1(x_k,y_l) + a_2\phi_2(x_k,y_l) + \ldots + a_N\phi_N(x_k,y_l)$$

The basis functions $\phi_1, \phi_2, \ldots \phi_N$ are determined, as mentioned above, by the transformation. The desired parameter vector of coefficients $\vec{a}^N = [a_1, a_2, \ldots, a_N]$ minimizes the square of the error between the reconstruction or reconstructed image function g and the original image function f:

$$E = \|g - f\|^2 = \sum_k \sum_l \left( \sum_{n=1}^{N} a_n \phi_n(x_k, y_l) - f(x_k, y_l) \right)^2 \rightarrow \text{MIN}$$

To accomplish this, partial differentiations are made in a known manner with respect to the components $a_q$ of parameter vector $\vec{a}^N$ and the derivatives are set to zero:

$$\frac{\partial E}{\partial a_q} = 2 \sum_k \sum_l \left( \sum_{n=1}^{N} a_n \phi_n(x_k, y_l) - f(x_k, y_l) \right) \cdot \phi_q(x_k, y_l) \stackrel{!}{=} 0$$

$$q = 1, \ldots, N$$

$$\rightarrow \sum_{n=1}^{N} a_n \sum_k \sum_l \phi_n(x_k, y_l) \phi_q(x_k, y_l) \stackrel{!}{=} \sum_k \sum_l f(x_k, y_l) \phi_q(x_k, y_l)$$

$$q = 1, \ldots, N$$

These equations are called normal equations. In order to determine the coefficients, that is the parameter vector $\vec{a}^N = [a_1, a_2, \ldots, a_N]$, it is necessary to solve the normal equations. The solvability of the equation system composed of N equations is determined by the number M of the given pixels within an image block and the number N of the unknown coefficients in the parameter vector $\vec{a}^N$. The following cases can be distinguished:

1. M<N: The parameters cannot be determined unequivocally. The equation system is therefore under-determined.

2. M=N: For the case of linearly independent basis functions, precisely one solution of the equation system can be guaranteed. The given data values are represented in a basis function system, the matrix of the basis functions $\Phi$. The determination of parameters a involves a transformation into another coordinate system. By employing the cosine function as the basis function system, the known DCT (discrete cosine transform) is obtained.

3. M>N: In this case, the original image function $f(x_k, y_l)$ and the reconstruction $g(x_k, y_l)$ will coincide only in exceptional cases since the equation system has more equations than unknowns. Graphically speaking, an attempt is made to have a line defined by two parameters pass through more than two points. The equation system is over-determined and can be solved by distributing the error to all supporting locations in the sense of minimizing the mean total error (least mean square=LMS).

Over-determined systems permit a compact description with respect to data compression since the given function values are described by a smaller number of parameters than existing data values. Moreover, this type of equalization of an error is able to reduce the effect of stochastic errors in the data points.

The equations of the system of normal equations to be solved are mutually coupled and not necessarily mathematically well conditioned. In order to obtain a solution for the parameter vector $\vec{a}^N$, the Gauss-Jordan algorithm (Bronstein/Semendjajew, *Taschenbuch der Mathematik* ["Pocketbook of Mathematics"], published by Verlag Herri Deutsch, 23rd Edition, pages 735-737) may be employed. However, the Gauss-Jordan algorithm is relatively complicated from a computational point of view. The complexity results from the coupled nature of the equations which of course is not changed by the Gauss-Jordan algorithm. The coupling of the equations is expressed, for example, in the fact that, in an attempt to improve the approximation by adding further coefficients, all equations must again be solved. In other words, the addition or omission of even one coefficient changes all other coefficients. An improvement in an existing approximation may be of significance for applications involving increased image build-up or adaptive methods.

The solution of the normalized equations is simplified mathematically to a considerably extent if a set of orthogonal basis functions is employed which meets the following condition for orthogonality:

$$\sum_k \sum_l \phi_n(x_k, y_l) \cdot \phi_q(x_k, y_l) = 0 \quad (1)$$

for $n \neq q$

The resulting coefficients are then uncorrelated. Therefore, orthogonal basis functions are employed exclusively. For example, the basis functions of the DCT shown in FIG. 1 are orthogonal.

Due to the orthogonality, the equation system is no longer coupled and the normal equations $$\sum_{n=1}^N a_n \cdot \sum_k \sum_l \phi_n(x_k, y_l)\phi_q(x_k, y_l) = \sum_k \sum_l f(x_k, y_l)\phi_q(x_k, y_l)$$

$$q = 1, \ldots, N$$

are simplified to $$a_q \cdot \sum_k \sum_l \phi_q(x_k, y_l)\phi_q(x_k, y_l) = \sum_k \sum_l f(x_k, y_l)\phi_q(x_k, y_l)$$

$$q = 1, \ldots, N$$

The desired coefficients $a_q$ can thus be calculated directly:

$$\rightarrow a_q = \frac{\sum_k \sum_l f(x_k, y_l)\phi_q(x_k, y_l)}{\sum_k \sum_l \phi_q(x_k, y_l)\phi_q(x_k, y_l)}$$

$$q = 1, \ldots, N$$

The orthogonal basis functions are orthonormal if the following applies:

$$\sum_k \sum_l \phi_q(x_k, y_l)\phi_q(x_k, y_l) = 1$$

Thus, the calculation of the coefficients is then further simplified to $$\rightarrow a_q = \sum_k \sum_l f(x_k, y_l)\phi_q(x_k, y_l) \quad (2)$$

$$q = 1, \ldots, N$$

Due to the introduction of orthogonality, the coefficients are obtained by representing the image function in the basis function system $\phi_q(x_k,y_l)$. In particular, if further coefficients are added, the values of all previously obtained coefficients now remain unchanged since the calculations of the coefficients take place independently of one another in a so-called hierarchic structure of the description.

Figure 2:
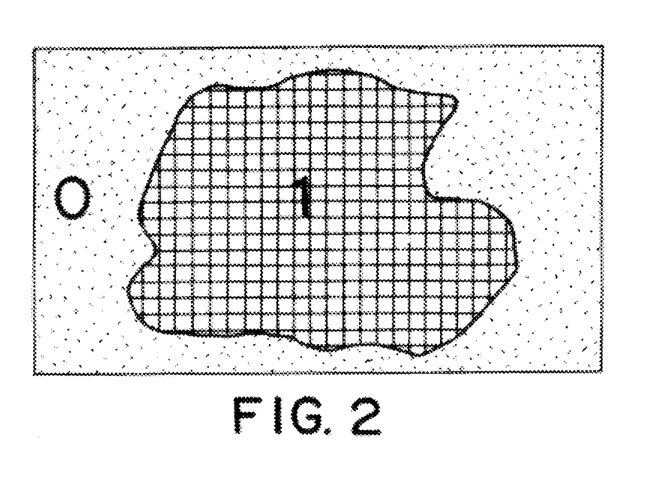
FIG. 2 gives an example of a two-value window function including a grid which symbolizes the basic sampling raster.

The problem of determining orthogonal basis functions for any desired shape of an image region will now be described. For this purpose orthogonalization is effected with respect to two-dimensional regions of the desired shape. Two functions $\phi_n$ and $\phi_q$ are orthogonal to one another if their scalar product disappears according to the above equation (1) for orthogonality. Orthogonalization is described, for example, by R. Zurmühl in *Praktische Mathematik für Ingenieure und Physiker*, ("Practical Mathematics for Engineers and Physicists"), 3rd Edition, 1961, pages 360–362. In order to restrict orthogonality of two dimensional functions to a specific region of the x,y plane, a two-dimensional window function w(x,y) is introduced. This function has values different from zero only within the specific region. An example of a two-value window function with respect to a region having an arbitrary boundary shape is shown in FIG. 2. The sampling raster (grid in FIG. 2) corresponds precisely to the pixel raster of the original image. With the aid of the window function the equation defining the condition for orthogonality becomes:

$$\sum_k \sum_l w(x_k, y_l)\phi_n(x_k, y_l)\phi_q(x_k, y_l) = 0$$

for $n \neq q$

The summation forming the reconstructed image function g now produces amounts different from zero only within the respective image segment; accordingly, the functions $\phi_n$ and $\phi_q$ are orthogonal with respect to the shape of the segment, expressed by the window function. It should be noted that the use of multi-value window functions permits the introduction of local weighting. However, this is not employed here below.

It is clear at once that two given functions cannot simultaneously be orthogonal with respect to differently shaped regions, except for the case of trivial solutions. On the other hand, image segments vary with respect to the shape and number of pixels they enclose. Consequently, a special set of orthogonal basis functions must be found for each individual image segment. In this connection, an image block represents a special segment shape for which orthogonal basis functions need to be determined only once unless the size of the block is varied.

The following theorem guarantees that only one set of orthogonal basis functions exists for each segment shape.

For a linearly independent set of functions $\vec{u}_1, \vec{u}_2, \ldots, \vec{u}_N$ in an N-dimensional sub-space $A^N$, there exists a set of functions $\vec{q}_1, \vec{q}_2, \ldots, \vec{q}_N$, which are orthogonal with respect to the same sub-space $A^N$. These orthogonal functions $\vec{q}_1, \vec{q}_2, \ldots, \vec{q}_N$ can even be represented as linear combinations of the given functions $$\vec{u}_1, \vec{u}_2, \ldots, \vec{u}_N.$$

The proof for this theorem can be found in the literature. For any desired segment shape it is possible to find a linearly independent set of starting functions. The computational derivation of the orthogonal basis functions from the linearly independent, non-orthogonal starting functions can be effected with the aid of the known mathematical methods of Schmidt (N. I. Achiser, *Vorlesungen über Approximationstheorie* ("Lectures on Approximation Theory"), 2nd Edition, 1967, published by Akademie Verlag, pages 24–26) or Householder (A. S. Householder, *Principles of Numerical Analysis*, McGraw-Hill Book Company, 1953, pages 72–78). Both methods furnish the same orthogonal functions except for different constant multiplication factors. In contrast to the Householder method, the Schmidt method permits the derivation of single individual functions which are orthogonal to the already calculated functions. The example of an image segment will serve as an explanation for an orthogonalization employing the Schmidt algorithm. If one employs the simple, linearly independent polynomials 1, x, y, $x^2$, x·y, $y^2$ as starting functions and bases the procedure on a rectangular sampling raster, the orthogonalization method furnishes the known Gram-Schmidt polynomials. These have a great similarity in their shape to Legendre polynomials which are orthogonal only with respect to the continuous case. The use of trigonometric functions thus constitutes a special case in that the functions are orthogonal with respect to rectangular image segments in the discrete case as well as in the continuous case. For arbitrarily shaped image segments, however, a method of orthogonalization such as have been described must be employed even if sine or cosine functions are employed.

Figure 3:
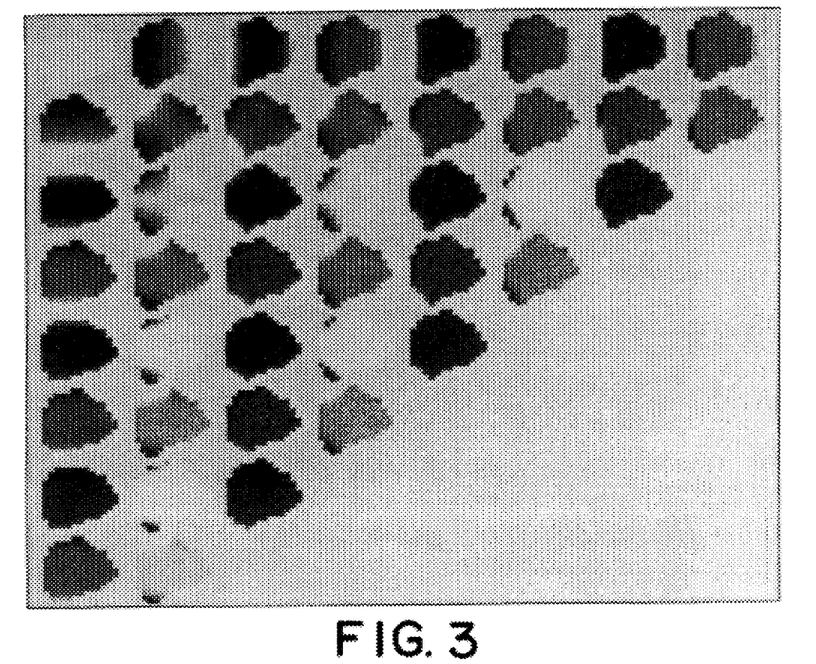
FIG. 3 shows basis images of nonorthogonal starter polynomials.

FIG. 3 shows basis images for the non-orthogonal basis functions $x^i \cdot y^j$ for a given segment shape. The basis functions are defined on the smallest square surrounding the segment; the value range of the coordinates covers the interval $[-1,+1]$ in the vertical as well as in the horizontal direction. The degree of the illustrated basis functions ascends from zero (constant) in the upper left-hand corner, for x in the horizontal direction and for y in the vertical direction. Next to the constant basis function, one therefore sees the respective functions $\phi_{10}=x$ (horizontal ramp) and $\phi_{01}=y$ (vertical ramp). The values of the remaining basis functions for higher powers of x and y exhibit little variation within the segment since the greatest changes occur in the direction of the edges, that is for $|x|, |y| \to 1$.

The basis functions illustrated here make immediately apparent the existence of substantial difficulties in the use of non-orthogonal basis functions of a higher degree than "one". Thus, the applicable literature often unjustifiably considers the polynomial approximation to be an image coding method that is not very promising, or it is reported that the use of higher degrees of polynomials does not bring any further improvement. The consequence is then often a segmentation into an excessively large number of small segments which can be described sufficiently accurately by means of polynomials of no higher degree than the first order. However, this procedure is in contradiction to the expected advantage of coding larger segments. At the same time, the quantity of data required for coding the shape or contour of the regions increases considerably.

Figure 4:
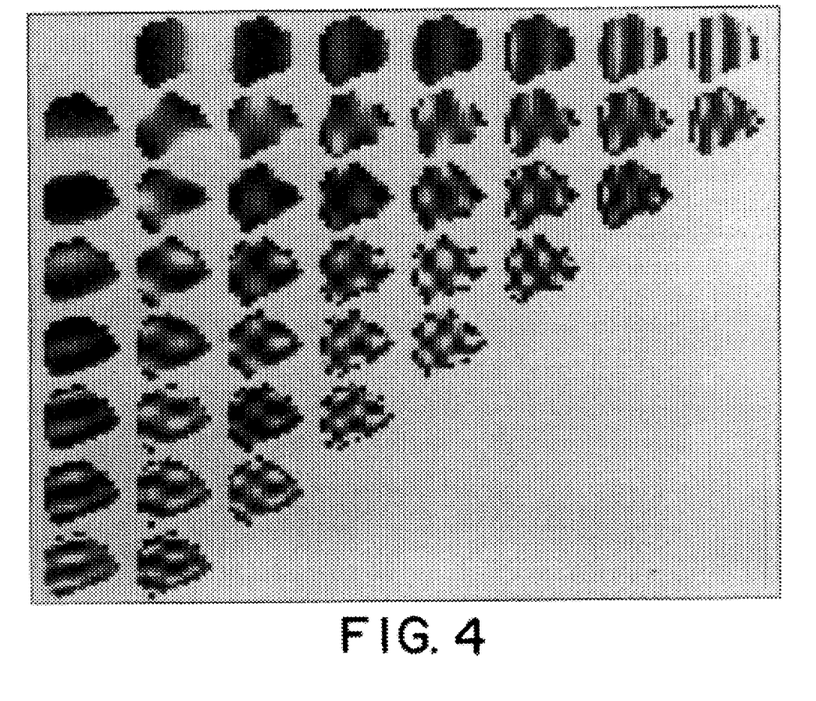
FIG. 4 shows basis images of orthogonal polynomials.

Basis images corresponding to the polynomials obtained after orthogonalization are illustrated in FIG. 4. The structures represented by the various basis images are clearly discernible. The figure makes apparent the suitability of these orthogonal functions for image description. The set of new basis functions includes at most as many functions as there are pixels within an image segment. For many applications, the number of basis functions in the original set, and the equal number of orthogonal basis functions in the new set, are substantially smaller than the number of pixels. After the orthogonal basis functions have been obtained, they are used in transform coding the image region (segment) in the same manner as for rectangular transforms according to equation (2) above, where the summation is only carried out over the region of the segment, as described by the window function.

Figure 5:
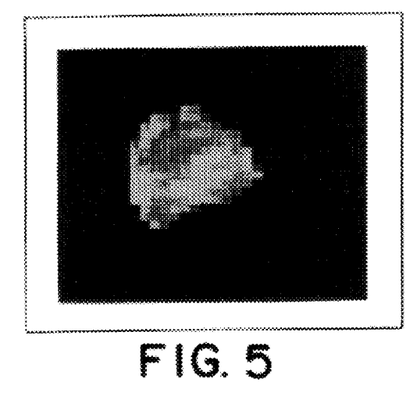
FIG. 5 is an illustration of an original segment.
Figure 6:
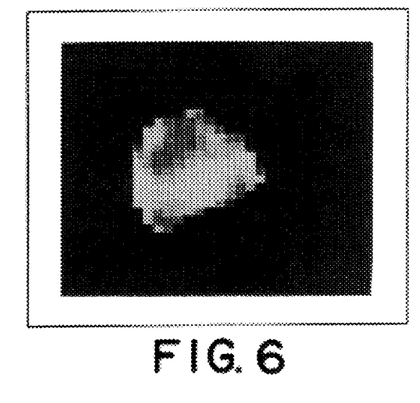
FIG. 6 is an illustration of a reconstructed segment.

FIG. 5 shows the gray scale values within the original image segment. The reconstructions obtained by means of orthogonal polynomials of at most the ninth degree is shown in FIG. 6. The figure clearly shows the noise reducing effect of the approximation. At the same time, structures within the segment are reproduced far better than would have been possible, for example, with polynomials of up to the second degree.

A set of orthogonal basis functions can be orthogonal only with respect to a special shape of a region and not simultaneously with respect to several shapes. However, that generally means that it is necessary to transmit not only a code representing the contour to describe the respective boundaries of the image segments and the coefficients for approximating the gray scale values in the interior but also the basis function system being employed in order to enable the receiver to reconstruct the gray scale values. The "overhead" created by the transmission of the basis function system, however, would most likely compensate for the gain in region oriented coding. A coder structure which does not require transmission of the basis function system will now be described.

Figure 7:
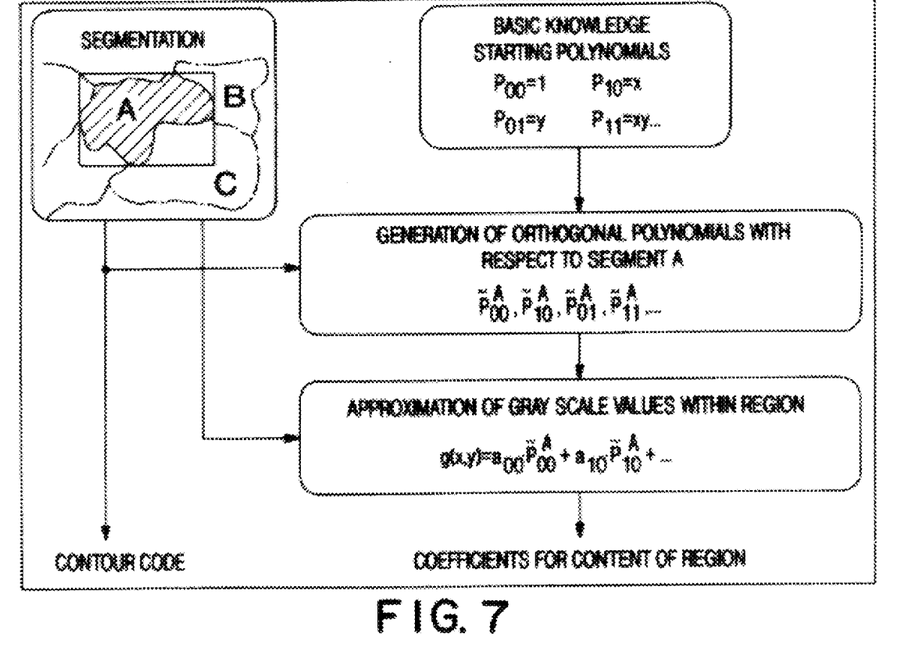
FIG. 7 is a block diagram of a coder according to the invention.

FIG. 7 is a block diagram of a coder structure which may be used to perform the method according to the invention. Based on a given segmentation, the contour (boundaries) of each segment and the gray scale values within each segment are separately coded.

The coder for the contours serves the purpose of representing the boundaries of each segment as efficiently as possible. Generally, one distinguishes between exact coding, for example, run length coding, and approximative coding with respect to a selected degree of error. The relatively high bit requirement is a drawback of exact coding; the literature speaks of approximately 1.4 bits per contour point. In the case of approximative coding, additional algorithms are required to eliminate the occurrence of overlaps between adjacent regions or "no-man's-land" between regions. Moreover, the contour must be reconstructed in the transmitter so that the orthogonalization process can be performed on the contour obtained in the receiver. Known methods may be employed to obtain the contour code and the corresponding reconstruction at the receiving end, for example, the method by E. L. Hall, described in *Computer Image Processing and Recognition*, Academic Press, pages 413–420 (7.3.1 Boundary Description) or the method described by E. K. Jain in *Fundamentals of Digital Image Processing*, Prentice Hall, pages 362–374 (9.6. Boundary Representation).

The location of the partial regions inside the complete image can be coded by employing a reference point for each partial region. An example of such a reference point is the center of gravity of the partial region. Another example is the topmost point belonging to that region or, if there is more than one topmost point, the leftmost of these. The location (e.g. coordinate inside image frame) of the reference point is coded and sent along with the data describing the contour and the content of the partial region to the receiver.

The coding of gray scale values within the region is effected segment by segment. For example, coding of the segment marked A in FIG. 7 takes place as follows: With the aid of a set of linearly independent basis functions Pij, the so-called basic knowledge, a set of orthogonal basis functions $\tilde{P}_i^A j$ is generated with reference to the shape of segment A. To do this, the orthogonalization process requires the contour information and may be performed using the window function w, as described above, according to the procedure described in the publications of Schmidt or Householder referred to above. The thus obtained orthogonal basis functions are utilized to define the gray scale values within the segment A. Segment A is completely described by the transmission of the contour code and the approximation coefficients.

Figure 8:
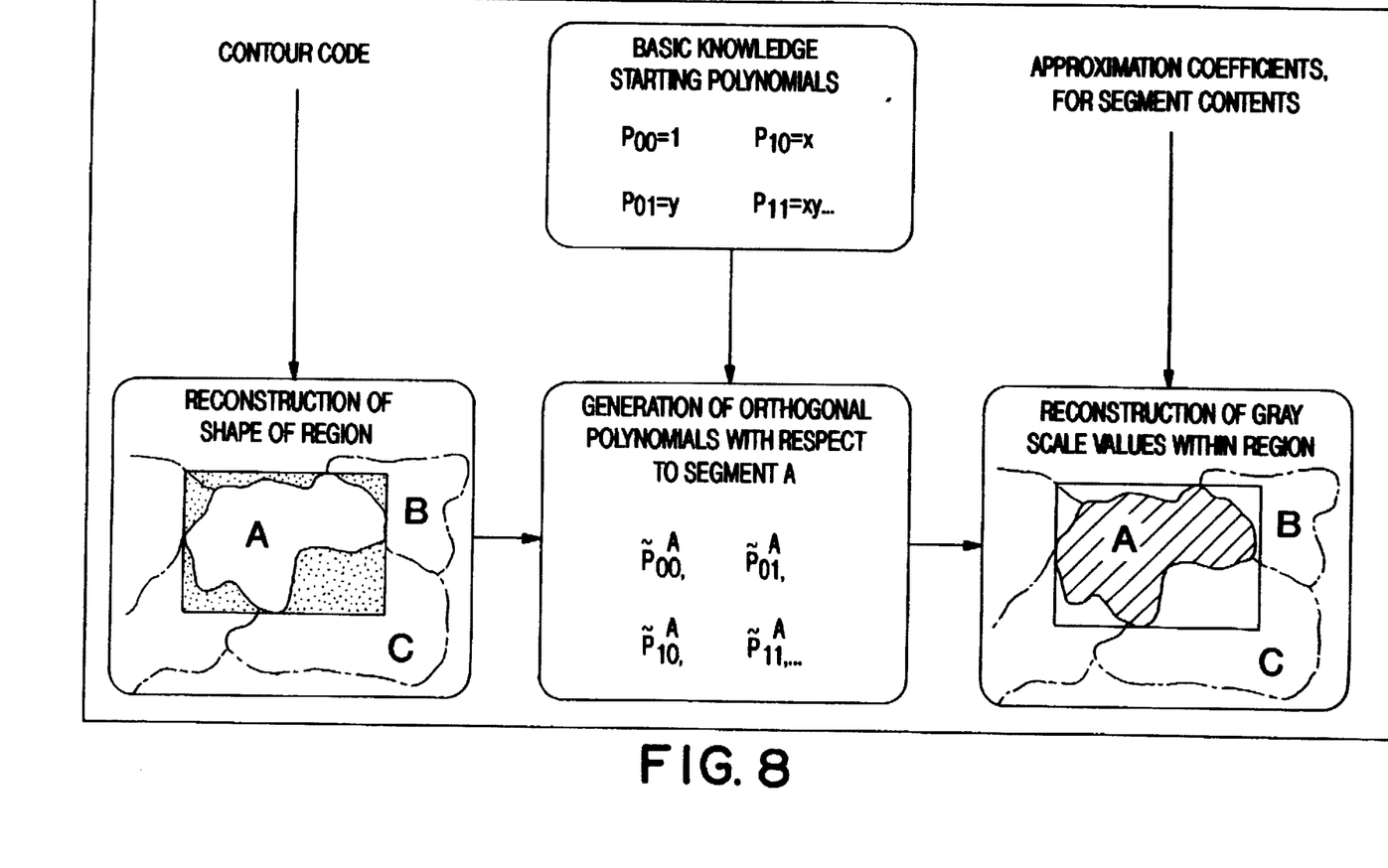
FIG. 8 is a block diagram of a decoder according to the invention.

The block circuit diagram of the decoder is shown in FIG. 8. Initially, the shape of segment A is reconstructed from the transmitted contour information. Since the receiver is equipped with the same basic knowledge (the set of linearly independent basis functions $P_ij$), the orthogonal basis functions can be generated analogously to the procedure at the transmitter based on the shape of the segment.

Once the shape of the segment has been reconstructed, the orthogonality equations are set up with the aid of the window function as described above. The orthogonal basis functions are generated by means of the above mentioned methods of Schmidt or Householder. Characteristic of the use of the window function and thus of the orthogonalization with respect to a two-dimensional shape is that in the calculation of the orthogonal basis functions only sampled values of the linearly independent, non-orthogonal basis functions which lie within the boundaries (contour) of the segment are employed.

The additional transmission of the orthogonal basis functions for each segment is redundant since the transmitted contour code contains the information on how to construct the basis functions. Finally, the gray scale values within the segment are reconstructed by a weighted sum of the orthogonal basis functions decoded from the transmitted contour code and approximation coefficients. The approximation coefficients here constitute the weighting factors used to provide an approximate reconstruction of the gray scale values by the decoder at the receiver.

In summary, the coding and decoding of each individual segment takes place as follows:

Coding:
1. description of the contour of the segment being observed to obtain the contour code;
2. generation of a set of orthogonal basis functions for the specific shape;
3. approximation of the gray scale values in the interior of the segment with approximation coefficients.

Transmission:
1. transmission of the contour code;
2. transmission of the approximation coefficients.

Decoding:
1. reconstruction of the shape of the segment;
2. generation of a set of orthogonal basis functions for the specific shape of the segment;
3. reconstruction of the gray scale values within the segment.

Different parameters of this coding scheme may be adapted to the actual use. Several parameters relating to the coding of the gray scale values will now be described in greater detail.

The set of linearly independent but non-orthogonal starting functions, called the "basic knowledge", is of course not limited to polynomials such as are used in the embodiment of FIGS. 7 and 8. It can be demonstrated that the only condition placed on the starting functions is their linear independence which, however, does not constitute a significant restriction. Thus, it is possible to use any of a multitude of different sets of basis functions as the starting point for the orthogonalization. This provides the advantage that the functions employed can be individually adapted to each respective segment. Thus, segments with soft luminance transitions can be advantageously represented with polynomials while Walsh functions are better suited for coding regions containing, for example, text. The use of cosine functions would correspond to use of the DCT and could furnish good results for segments containing periodic variations in gray scale values.

In order for the receiver to be informed which of a predetermined number of types of basis functions is being used for a particular partial region, a code, which references the type of basis functions to be used for that particular partial region, is sent to the receiver in addition to the other data being sent.

A further parameter for adapting the method to actual use is the degree of quantization of the individual coefficients. The quantization of the coefficients is equivalent to the case of a block-oriented transform. Many different techniques are described in the literature, for example, Section 4.4.3 of the JPEG (Joint Photographic Experts Group) draft standard, which has been submitted to ISO (JPEG—8-R4, ISO/IEC JTC1/SC2/WG8 CCITT SGVIII, Aug. 31, 1989). It can be especially advantageous, to consider an adaption of the employed quantization to the order of the coefficient and therefore to the basis function, represented by the coefficient. It has already been stated that the human visual system is less susceptible to higher spatial frequencies. Therefore, coefficients corresponding to basis functions showing higher spatial frequencies are quantized more coarsely than others. Both transmitter and receiver agree on the type of quantizer to be used for each coefficient.

Still another parameter for adapting the method to actual use, and related to quantization, is the number of approximation coefficients employed per segment or, its equivalent, the accuracy of the reconstruction. Due to the use of orthogonal basis functions, if certain coefficients have been transmitted to provide a particular order of approximation to the original image (resolution), and it is decided to improve the approximation, additional coefficients may be transmitted and the earlier transmitted coefficients remain unchanged. This not only corresponds to the principle of an hierarchical representation but also offers the opportunity to be discussed below of a "growing" image build-up, interaction with the user and adaptation to the content of the image.

The technology of progressive image build-up is employed, for example, in the transmission of image data over low bit rate channels. Initially an observer is shown a rough (coarse) image or a lowpass filtered image which is reconstructed at the end of a first image build-up phase. Detail information is added successively during further image build-up phases—by determining additional basis functions of a higher order and corresponding additional coefficients—until the desired resolution has been realized. In contrast to a conventional sequential line-by-line build-up of the image, with a growing image build-up according to the invention, the observer receives useful information right at the beginning of the transmission. Due to the orthogonality of the determined basis functions, the coefficients determined during previous image build-up phases retain their validity and need not be computed anew. One example in this connection is the call-up of images from a data bank. Often, the user can decide in an early stage of image build-up whether the image contains the desired information. The user is then able, in interaction with the system at each stage, to cause further detail information to be transmitted or stop the transmission and thus save time and money.

Figure 9:
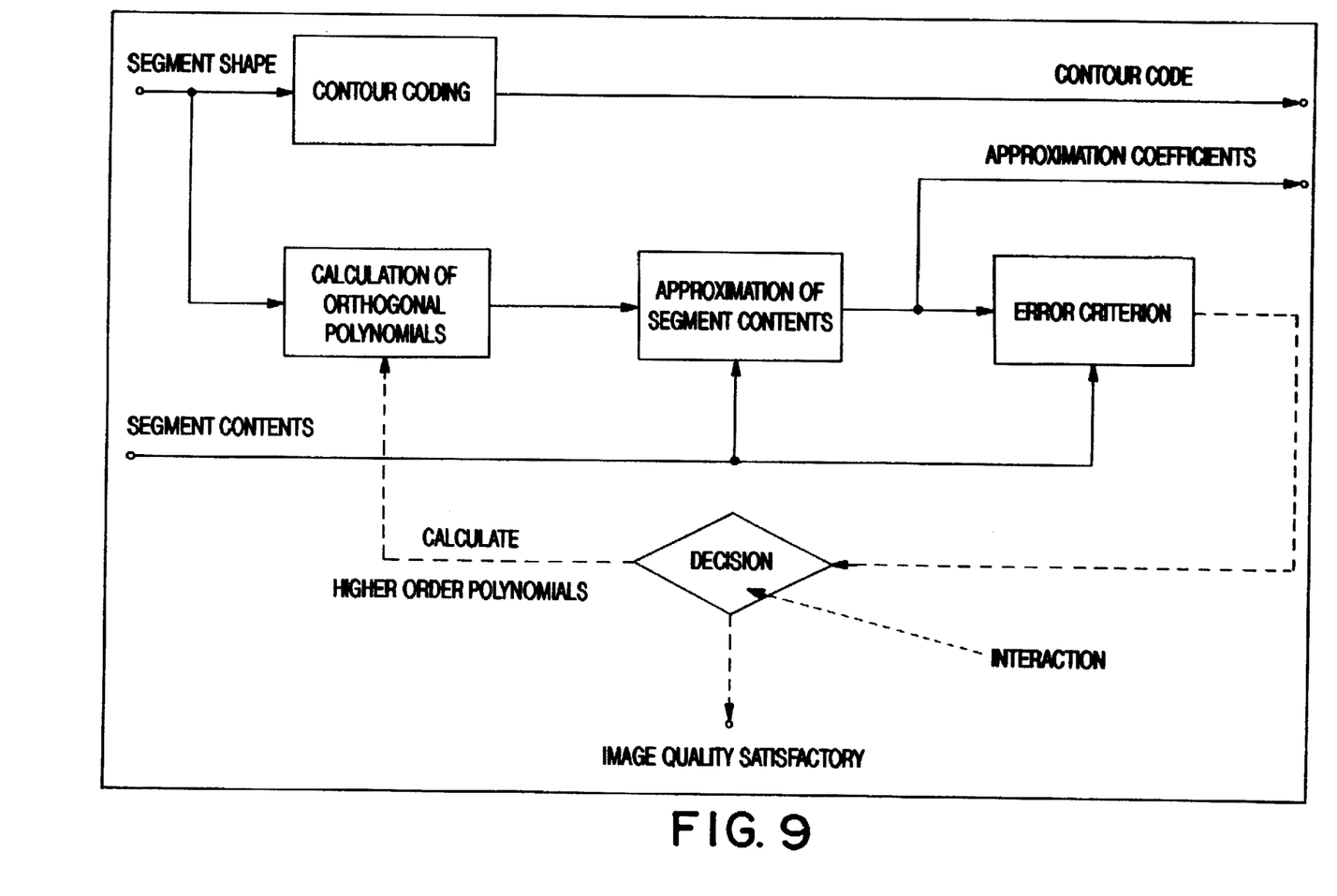
FIG. 9 is a flow chart for a progressive reconstructive build-up of an image according to the invention.

FIG. 9 is a flow chart illustrating the method in which the quality of the reconstruction is improved in steps. The treatment of the contour and the derivation of the orthogonal basis functions is identical to that effected by the coder structure shown in FIG. 7. However, two further steps are also required. Reconstruction of the gray scale values in the transmitter permits a comparison of the reconstruction with the gray scale values of the original segment. If the quality of the reconstruction is insufficient, an improved approximation can be obtained adaptively, or by user interaction by transmitting higher order basis functions to the receiver, as described above.

If a hybrid codec (coder-decoder) is employed to code video image sequences by forming residual error images, each of which is formed by a difference between the momentary image of the video sequence and an estimated image generated from the preceding coded and decoded image, only those partial image regions of each residual error image are coded which are distinguished by particularly high error amplitudes. Such partial image regions may have any shape. This use of the hybrid codec avoids the previously customary description of the residual error image by means of block-shaped partial image regions which resulted because of the exclusive use of a block oriented transformation rule. Thus, this use prevents the unnecessary transmission of pixels with negligibly small error amplitudes within image blocks containing residual error pixels with nonnegligible error amplitudes.

For the case that only a sub-quantity of coefficients is to be transmitted to the receiver, as described above, the receiver is to be informed which coefficients have been selected. One possibility is the transmission of the coefficients in an ordered way, e.g. in a scanning fashion (refer to FIG. 1), and sending a small code for each coefficient that has been set to zero, that is, has been omitted. Another solution is described in Section 4.4.4 of the abovementioned JPEG (Joint Photographic Experts Group) document. It will be understood that the above description of the present invention is susceptible to various modifications, changes and adaptations, and the same are intended to be comprehended within the meaning and range of equivalents of the appended claims.

What is claimed is:

1. A method of coding digital image data of an original video image, comprising the steps of:
   (1) subdividing the original image into partial image regions of respective shapes whose contours differ;
   (2) for each partial image region, determining sampled values of a set of initial two-dimensional, linearly independent basis functions of the image data in the partial image region, the basis functions being defined over an area including at least the whole area of the partial image region, the sampled values of the basis functions having a raster corresponding to the pixel raster of the original image;
   (3) for each partial image region, orthogonalizing the sampled values of the basis functions disposed within the area defined by the partial image region in order to obtain a new set of orthogonal basis functions, with the new set including, at most, as many orthogonal basis functions as there are pixels within the partial image region; and
   (4) for each partial image region, determining and coding respective coefficients of the new set of orthogonal basis functions, a sum of the orthogonal basis functions multiplied by the respective coefficients representing the gray scale values of the partial image region, the coded coefficients representing an approximation of the partial image region; and,
further comprising, in an initial build-up phase and at least one further build-up phase, the steps of transmitting the coded digital image data to a receiving location and reconstructing the transmitted image data at the receiving location, wherein for each partial image region a video image sequence is coded and transmitted in such a manner that at the receiving location a first reconstructed image is determined at the end of the initial image build-up phase from a first number of the orthogonal basis functions and a first number of the coefficients, the first number being substantially less than the number of pixels in the partial image region, and, at the end of a second image build-up phase, an improved reconstruction of the image is obtained from a second number of the orthogonal basis functions and a second number of the coefficients, the second number of the orthogonal basis functions being of a higher order than the order of the first number of orthogonal basis functions.

2. A method as defined in claim 1, wherein the number of image build-up phases is controlled as a function of a desired image resolution.

3. A method of coding digital image data of an original video image which is defined over an area of arbitrary shape, comprising the steps of:
   determining sampled values of a set of initial two-dimensional, linearly independent basis functions of the image data in the original image, the basis functions being defined over an area at least including the whole area of the original image, the sampled values of the basis functions having a raster corresponding to the pixel raster of the original image;
   orthogonalizing the sampled values of the basis functions disposed within the area defined by the original image in order to obtain a new set of orthogonal basis functions, with the new set including, at most, as many orthogonal basis functions as there are pixels within the original image; and
   determining and coding respective coefficients of the new set of orthogonal basis functions, a sum of the orthogonal basis functions multiplied by the respective coefficients representing the gray scale values of the original image, the coded coefficients representing an approximation of the original image.

4. A method of coding digital image data of an original video image, comprising the steps of:
   (1) subdividing the original image into partial image regions of respective shapes whose contours differ;
   (2) for each partial image region, determining sampled values of a set of initial two-dimensional, linearly independent basis functions of the image data in the partial image region, the basis functions being defined over an area including at least the whole area of the partial image region, the sampled values of the basis functions having a raster corresponding to the pixel raster of the original image;
   (3) for each partial image region, orthogonalizing the sampled values of the basis functions disposed within the area defined by the partial image region in order to obtain a new set of orthogonal basis functions, with the new set including, at most, as many orthogonal basis functions as there are pixels within the partial image region; and
   (4) for each partial image region, determining and coding respective coefficients of the new set of orthogonal basis functions, a sum of the orthogonal basis functions multiplied by the respective coefficients representing the gray scale values of the partial image region, the coded coefficients representing an approximation of the partial image region.

5. A method as defined in claim 4, wherein said step (1) includes subdividing the original image such that the partial regions have similar structures and said set (2) includes the step of selecting the initial basis functions with reference to the local image content such that the local image content is substantially describable with a small number of the coefficients of the orthogonal basis functions.

6. A method as defined in claim 4, wherein said step (1) includes subdividing the original image such that the partial regions have similar structures and said step (2) includes the step of selecting the set of initial basis functions from among a plurality of predetermined different sets of basis functions with reference to the local image content such that the local image content is substantially describable with a small number of the coefficients of the orthogonal basis functions.

7. A method as defined in claim 6, wherein at least one of the partial image regions contains soft luminance transitions and the plurality of sets includes a set of basis functions which consists of polynomials, said step of selecting comprising the step of selecting polynomials as the original basis functions for any partial image regions containing soft luminance transitions.

8. A method as defined in claim 6, wherein at least one of the partial image regions contains text and the plurality of sets includes a set of basis functions which including of Walsh functions, said step of selecting comprising the step of selecting Walsh functions as the set of original basis functions for any partial image regions containing text.

9. A method as defined in claim 6 wherein at least one of the partial image regions has a periodic texture and the plurality of sets includes a set of cosine basis functions, said step of selecting comprising the step of selecting cosine basis functions as the original basis functions for the at least one of the partial image regions having a periodic texture.

10. A method as defined in claim 4, further comprising the steps of producing a residual error image as a difference between a momentary image in video image sequence and an approximate image generated from the image preceding it; and coding only such partial image regions of the residual error image by said steps (1)–(4) which are distinguished by high error amplitudes.

11. A method as in claim 4, wherein said step (1) includes subdividing the original image such that the contours of the respective shapes are adapted to local image structures.

12. A method of transmitting coded image data, comprising the steps of:

coding the image data according the steps of claim 6;

coding contours of the partial image regions to obtain coded contour information; and for each partial image region, transmitting the small number of coefficients and the coded contour information without the orthogonal basis functions, the transmitted coefficients being weighing factors of the subset of the set of orthogonal basis function in an approximate representation of the partial image region.

13. A method of transmitting coded image data, comprising the steps of:

coding the image data according the steps of claim 4;

coding contours of the partial image regions to obtain coded contour information; and for each partial image region, transmitting the coefficients of a subset of the set of orthogonal basis functions and the coded contour information without transmitting the orthogonal basis functions, the transmitted coefficients being weighing factors of the subset of the orthogonal basis functions and providing an approximate representation of the partial image region.

14. A method of transmitting coded image data, comprising the steps of:

coding the image data according the steps of claim 4;

coding contours of the partial image regions to obtain coded contour information; and for each partial image region, transmitting the coefficients and the coded contour information without the orthogonal basis functions, the coefficients being weighing factors of the orthogonal basis functions in a representation of the partial image region.

15. A method as defined in claim 14, further comprising the steps of receiving the transmitted coded coefficients and contour information, reconstructing the specific shape of the partial image region from the received contour information; regenerating the set of orthogonal basis functions from the specific shape; and reconstructing the gray scale values within the partial image region as a weighted sum of the orthogonal basis functions, with the transmitted coded coefficients constituting weighing factors of the orthogonal basis functions.

* * * * *